United States Patent
Doumbouya et al.

(12) 
(10) Patent No.: US 11,816,565 B2
(45) Date of Patent: Nov. 14, 2023

(54) SEMANTIC COHERENCE ANALYSIS OF DEEP NEURAL NETWORKS

(71) Applicant: Apple Inc., Cupertino, CA (US)

(72) Inventors: Moussa Doumbouya, Santa Clara, CA (US); Xavier Suau Cuadros, Barcelona (ES); Luca Zappella, Sunnyvale, CA (US); Nicholas E. Apostoloff, San Jose, CA (US)

(73) Assignee: Apple Inc., Cupertino, CA (US)

( * ) Notice: Subject to any disclaimer, the term of this patent is extended or adjusted under 35 U.S.C. 154(b) by 510 days.

(21) Appl. No.: 16/792,835

(22) Filed: Feb. 17, 2020

(65) Prior Publication Data

US 2021/0117778 A1   Apr. 22, 2021

(30) Foreign Application Priority Data

Oct. 16, 2019   (ES) .............................. ES201930916

(51) Int. Cl.
| | | |
|---|---|---|
| G06N 20/10 | (2019.01) | |
| G06N 3/045 | (2023.01) | |
| G06N 3/08 | (2023.01) | |

(52) U.S. Cl.
CPC .............. *G06N 3/08* (2013.01); *G06N 3/045* (2023.01); *G06N 20/10* (2019.01)

(58) Field of Classification Search
None
See application file for complete search history.

(56) References Cited

U.S. PATENT DOCUMENTS

| | | |
|---|---|---|
| 7,805,388 B2 | 9/2010 | Weston |
| 10,452,977 B2 * | 10/2019 | Son .................. G06N 3/063 |

(Continued)

FOREIGN PATENT DOCUMENTS

| | | |
|---|---|---|
| BR | 112019027609 | 7/2020 |
| CN | 106257495 | 12/2016 |

(Continued)

OTHER PUBLICATIONS

David Bau, et al., :Network Dissection: Quantifying Interpretability of Deep Visual Representation, IEEE, In Computer Vision and Pattern Recognition, 2017, pp. 6541-6549.

(Continued)

*Primary Examiner* — Tsung Yin Tsai
(74) *Attorney, Agent, or Firm* — Robert C. Kowert; Kowert, Hood, Munyon, Rankin & Goetzel, P.C.

(57) ABSTRACT

Methods and apparatus are disclosed for interpreting a deep neural network (DNN) using a Semantic Coherence Analysis (SCA)-based interpretation technique. In embodiments, a multi-layered DNN that was trained for one task is analyzed using the SCA technique to select one layer in the DNN that produces salient features for another task. In embodiments, the DNN layers are tested with test samples labeled with a set of concept labels. The output features of a DNN layer are gathered and analyzed according to the concepts. In embodiments, the output is scored with a semantic coherence score, which indicates how well the layer separates the concepts, and one layer is selected from the DNN based on its semantic coherence score. In some embodiments, a support vector machine (SVM) or additional neural network may be added to the selected layer and trained to generate classification results based on the outputs of the selected layer.

20 Claims, 12 Drawing Sheets

(56) References Cited

U.S. PATENT DOCUMENTS

| | | | |
|---|---|---|---|
| 10,646,156 B1* | 5/2020 | Schnorr | G16H 30/40 |
| 10,747,989 B2* | 8/2020 | Zou | G06V 10/82 |
| 10,769,524 B1* | 9/2020 | Natesh | G06F 18/24 |
| 10,867,169 B2* | 12/2020 | Zhuravlev | G06F 18/217 |
| 10,944,767 B2* | 3/2021 | Goswami | H04L 63/1416 |
| 2004/0260550 A1* | 12/2004 | Burges | G10L 17/00 704/259 |
| 2015/0310365 A1* | 10/2015 | Li | G06Q 10/063 705/7.11 |
| 2016/0292567 A1 | 10/2016 | George | |
| 2017/0140253 A1* | 5/2017 | Wshah | G06V 20/54 |
| 2018/0032867 A1* | 2/2018 | Son | G06N 3/04 |
| 2019/0026609 A1* | 1/2019 | Shen | G06N 3/08 |
| 2019/0205620 A1* | 7/2019 | Yi | G06N 3/08 |
| 2019/0238568 A1* | 8/2019 | Goswami | G06F 21/566 |
| 2019/0311194 A1* | 10/2019 | Zhuravlev | G06F 18/24 |
| 2020/0065563 A1* | 2/2020 | Zou | G06N 3/045 |
| 2020/0065612 A1* | 2/2020 | Xu | G06V 40/174 |
| 2020/0218984 A1* | 7/2020 | Thornton | G06N 3/088 |
| 2020/0394416 A1 | 12/2020 | Gong | |
| 2021/0174191 A1* | 6/2021 | Dube | G06N 3/08 |

FOREIGN PATENT DOCUMENTS

| | | |
|---|---|---|
| CN | 107944020 | 4/2018 |
| CN | 109376763 | 2/2019 |
| JP | 2018088182 | 6/2018 |
| WO | 2016118513 | 7/2016 |

OTHER PUBLICATIONS

Been Kim, et al., "Interpretability Beyond Feature Attribution: Quantitative Testing with Concept Activation Vectors (TCAV)", arXiv:1711.11279v5, Jun. 7, 2018, pp. 1-18.

Brenden M. Lake, et al., "Human-level concept learning through probabilistic program induction", Retrieved from www.sciencemag.org, Dec. 11, 2015, vol. 350, Issue 6266, pp. 1332-1338.

K.R. Clarke, "Non-parametric multivariate analyses of changes in community structure", Australian Journal of Ecology, 1993, pp. 117-143.

Kaiming He, et al., "Spatial Pyramid Pooling in Deep Convolutional Networks for Visual Recognition", arXiv:1406.4729v4, Apr. 23, 2015, pp. 1-14.

Shaoqing Ren, et al., "Faster R-CNN: Towards Real-Time Object Detection with Region Proposal Networks", In NIPS, 2015, pp. 1-9.

Derek Hoiem, et al., "Diagnosing Error in Object Detectors", Retrieved from https://web.engr.illinois.edu/~dhoiem/publications/eccv2012_detanalysis_derek_pdf, 2012, pp. 1-14.

U.S. Appl. No. 16/792,842, filed Feb. 17, 2020, Enguerrand Morel, et al.

N. Tekeli and A. B Can, "Distance Based Training for Cross-Modality Person Re0Identification," 2019, IEEE/CVF Internaional Conference on Computer Vision Workshop (ICCVW) (pp. 4540-4549), Publication Dated Oct. 1, 2019.

A. Ding and et al., "Deep Feature Learning with Relative Distance Comparison for Person Re-Identification," Pattern Recognition vol. 48, Issue 10, Oct. 2015, pp. 2993-3003, Elsevier, https://doi.org/10.1016/].patcog.2015.04.005, 2015.

Liang, et al., "Automated essay scoring: A Siamese bidirectional LSTM neural Network architecture," MDPI, Symmetry 10, 682, No. 12, 2018, pp. 1-16.

Brock, et al., "Neural Photo Editing with introspective adversarial networks," Published at ICLR 2017, retrieved from arXiv preprint arXiv:1609.07093, 2016, pp. 1-15.

Wu, et al., "Learning to extract coherent summary via deep reinforcement learning," In Proceedings of the AAAI conference on artificial intelligence, vol. 32, No. 1, 2018, pp. 5602-5609.

* cited by examiner

SEMANTIC COHERENCE ANALYSIS OF DEEP NEURAL NETWORKS

BACKGROUND

Technical Field

This disclosure relates generally to machine learning systems, in particular techniques of analyzing deep neural networks (DNNs) to determine concepts that can be identified in intermediate representations of a neural network.

Description of Related Art

Machine trained deep neural networks (DNNs) have many useful applications. However, despite their recent popularity, DNNs remain mostly black boxes to model developers. The knowledge learned by a DNN is generally hidden from humans and cannot be easily extracted in a human-understandable form. Due in part to this opacity, it is generally difficult to reuse DNNs trained for one task to perform a different task, even when a DNN may have learned useful concepts that are helpful for performing the different task. The development of high quality, application-specific DNNs is a time-consuming and expensive endeavor, typically requiring vast amounts of training data and many hours of training time. Better tools are needed to allow model developers to better understand the semantic knowledge encoded in DNNs, so that they can be more easily analyzed, diagnosed, and adapted for reuse.

DETAILED DESCRIPTION

Embodiments of methods and apparatus are disclosed herein for performing semantic coherence analysis on a deep neural network (DNN) is described.

Despite their popularity, Deep Neural Networks (DNNs) remain mostly black boxes. During training, a DNN may learn concepts beyond the task for which it was trained. Embodiments of methods and systems disclosed herein may be used to provide insight into these learned concepts by exploring what concepts are captured within the intermediate feature representations of a DNN. In some embodiments, a Semantic Coherence Analysis (SCA) technique is used to provide a score for individual layers in the DNN. In some embodiments, the SCA score is high when desired concepts are well separated in the output feature space of the layer, and is low when the concepts are not well separated. In some embodiments, the result of the analysis is a mapping concept-to-layer that provides insight on what the DNN has learnt. In some embodiments, the analysis may select one layer of the DNN that produces the purest feature clusters for the desired concepts. Embodiments of SCA systems have many applications. For example, the disclosed SCA technique may be used in a variety of different applications such as transfer learning, incremental learning, concept-based retrieval, and error analysis.

In some embodiments, the disclosed Semantic Coherence Analysis (SCA) technique provides a way to interpret what a trained DNN has learnt in its intermediate layers. In some embodiments, the SCA scores the semantic coherence of the output feature space of the DNN's intermediate layers with respect to a set of semantic concepts. In some embodiments, the SCA technique may use the feature spaces produced by each DNN layer. However, other feature space could be used in other embodiments. For example, in some embodiments, a form of projection or pooling of the feature space can be applied, or the feature space of a layer could be concatenated with that of another layer.

Figure 1:
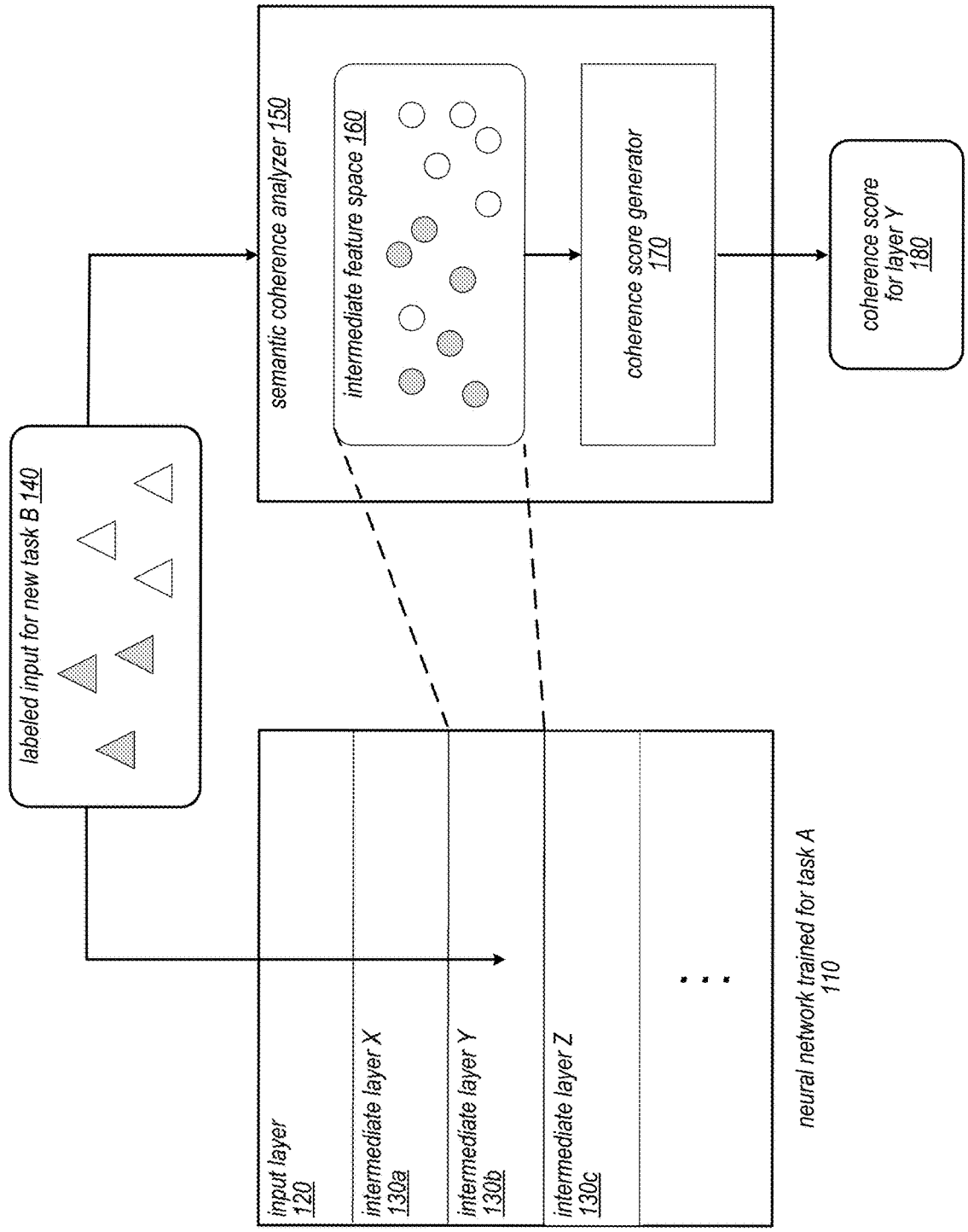
FIG. 1 illustrates the operations of a semantic analyzer that performs a Semantic Coherence Analysis (SCA) technique to analyze layers in a trained neural network, according to some embodiments.

While training, a model may learn much more than the task for which it is explicitly trained. For example, early layers of the DNN may learn general features of the input that is independent of the labels, which may be used to perform other machine learning tasks. This hidden knowledge may be captured within the intermediate layers of a DNN. Trained intermediate layers of the DNN may project data points into rich and diverse feature spaces. However, the semantics encoded by those feature spaces are usually poorly understood. Semantic concepts can easily be specified using labeled examples (FIG. 1). Embodiments of the SCA technique may be used to produce a concept-to-layer mapping that helps unveil part of the hidden knowledge captured by a trained model, or to select a layer of the DNN with an output feature space that is best suited for a transfer task.

Different approaches of interpreting DNNs via concepts learned by intermediate layers using different techniques may be used. These approaches may differ in how the mapping concept-to-layer is determined. Under one approach, an intersection over union process is used to assess how well a set of activations spatially aligns with the presence of a concept. Under another approach a linear classifier is used to assess how separable a concept is from other concepts. However, embodiments of the SCA technique disclosed herein overcomes the limitations of other DNN interpretation techniques, which may be constrained to spaces produced by individual filters or assume linear separability.

While the mapping produced by the SCA technique provides insight by itself, embodiments of the technique can also be used to select individual layers of the DNN for new machine learning tasks, opening the door to many interesting applications such as transfer learning, incremental learning, few-shot learning, concept-based retrieval, and others.

Embodiments of the Semantic Coherence Analysis Technique

The SCA technique may be used to examine a feature space and some examples for each concept c. In some embodiments, the feature space may be the features generated by a layer in a trained DNN model that was trained to perform one machine learned task, and the DNN model may be analyzed to determine if it produces salient features for performing a different task. In some embodiments, the different task may involve recognizing certain new concepts in the input data that the DNN was not explicitly trained to recognize. However, if the features output by a given layer exhibits a good semantic coherence over these concepts, then the features output may be useful for performing the different task.

For example, FIG. 1 depicts a semantic coherence analyzer 150 that performs an SCA of a trained neural network, according to some embodiments. As shown, the neural network 110 is previously trained for an old task A. Neural network 110 may include a number of distinct layers, including an input layer 120 that accepts input data, and a number of successive intermediate layers 130a-c. In some embodiments, the input to the input layer 120 may be records to be analyzed by the neural network, which may be image samples or other types of input data. In some embodiments, the intermediate layers 130a-c may each receive input features from a previous layer, and generate output intermediate features for the next intermediate layer. For example, in some embodiments of image analysis networks, each intermediate layer may generate a set of feature maps of the original input image.

As shown, to analyze a layer in the neural network with the SCA technique, a set of labeled input for a new task B 140 is first obtained. The labeled input is formatted as input data that can be consumed by the neural network 110, but labeled with the truth labels for a new task B. In the figure, each shape represents an input sample, and samples with different colorings are labeled as different classes. For example, while the neural network 110 may be trained to detect and classify general objects in images, the labeled input may include labeled images of hand written characters, which represents a different type of classification task that the neural network was not specifically trained for. However, as discussed, the neural network 110 may nonetheless have gain some knowledge about the new task, and the SCA can be used to determine how well each individual layer in the neural network 110 can produce coherent results for the new task.

As shown, in this example, layer Y 130b is being analyzed by the semantic coherence analyzer 150. To perform the analysis, output features for the labeled input data set 140 are extracted from the neural network 110, and provided as input in the analyzer 150. The output features all lie in an intermediate feature space 160 of the intermediate layer Y. As discussed, the analysis will quantify how useful information in the feature space 160 is in performing the new task B, or how much semantic coherence the feature space provides for the new task.

In order to measure the semantic coherence of the feature space for the new task, a coherence score generator 170 may be implemented. In some embodiments, the semantic coherence analyzer 150 and the coherence score generator 170 may be implemented in one or more software modules, which may be executed on a computer system. The coherence score generator 170 may analyze the features outputted by the intermediate layer Y 130b, and determine how well these features can be used to infer their associated labels. The results of the analysis may be quantified in a coherence score 180, as shown. The coherence score 180 may be calculated in a variety of ways, as discussed in the examples that follow. The coherence score 180 can be generated by the generator 170 without having to train a machine learned model to perform the new task from the layer's output features.

In some embodiments, the SCA may be performed for each intermediate layer 130a-c in the neural network to compute a respective coherence score 180 for each layer. Then, based on the respective scores, a best layer may be selected from the neural network to build a new machine learned model for the new task B. In some embodiments, a support vector machine (SVM) may be trained to interpret the output features of the selected layer, to implement a new classifier for the new concept classes. In some embodiments, non-linear feature extractors may be used instead. In some embodiments, additional neural network layers may be trained based on the selected layer. For example, additional neural network layers may be trained to further analyze the output of the selected layer to implement an extended classifier that can distinguish between the new concept classes. In some embodiments, the original neural network may be augmented to branch from selected layer, so that the augmented network can produce new output classes for the new concepts in additional to the output classes of the original network. As may be understood, the selection of intermediate layers in a pre-trained neural network in the disclosed fashion is useful in many contexts including transfer learning and incremental learning, where machine learning models are augmented over time by building upon previously trained models.

In some embodiments, to generate the coherence score 180, the SCA technique may compute a mutual information score. Given a set of concepts $c=\{c_1, c_2, \ldots, c_k\}$ where k is the number of unique concepts, and a set of samples $F=\{f_1, f_2, \ldots, f_n\}$ encoded in feature space f, the mutual information score quantifies the amount of information (e.g. measured in bits) obtained about the concepts c given the feature space f. Thus, the mutual information score indicates a (probabilistic) dependence between some group of the concepts c and the feature space f. Depending on the embodiment, the group may include the entire concept set c or one individual one concept $c_i$. In some embodiments, the mutual information score may reflect how well the examples of the concepts in the concept set c cluster within the feature space f. In some embodiments, in order to perform such assessment, the first step is to perform a clustering in of the output features of a given layer in feature space f. In some embodiments, the purity of the clustering result is then evaluated via the Semantic Coherence score $S_c^f$. For example, let $D_c$ be the distribution of labeled examples for concept c, let $D_c^f$ be the distribution of cluster assignments in f, and let $H(x)$ and $H(x|y)$ be the entropy of x and the conditional entropy of x given y, respectively. The semantic coherence score $S_c^f$ may be defined as the normalized mutual information of the two distributions $D_c$ and $$D_c^f : S_c^f = \frac{H(D_c) - H(D_c | D_c^f)}{\sqrt{H(D_c) \cdot H(D_c^f)}}.$$

Figure 3:
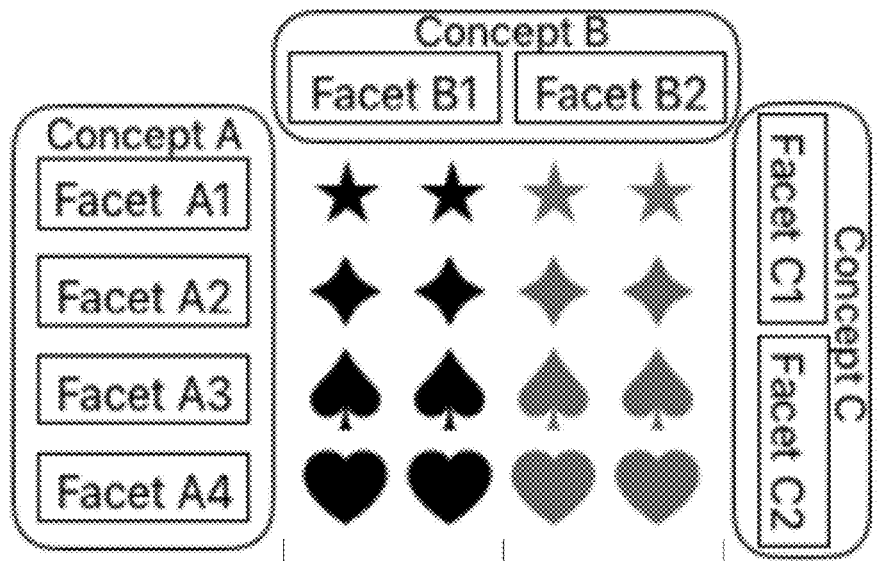
FIG. 3 illustrates example concepts and scores that are determined for each concept using SCA, according to some embodiments.
Figure 3:
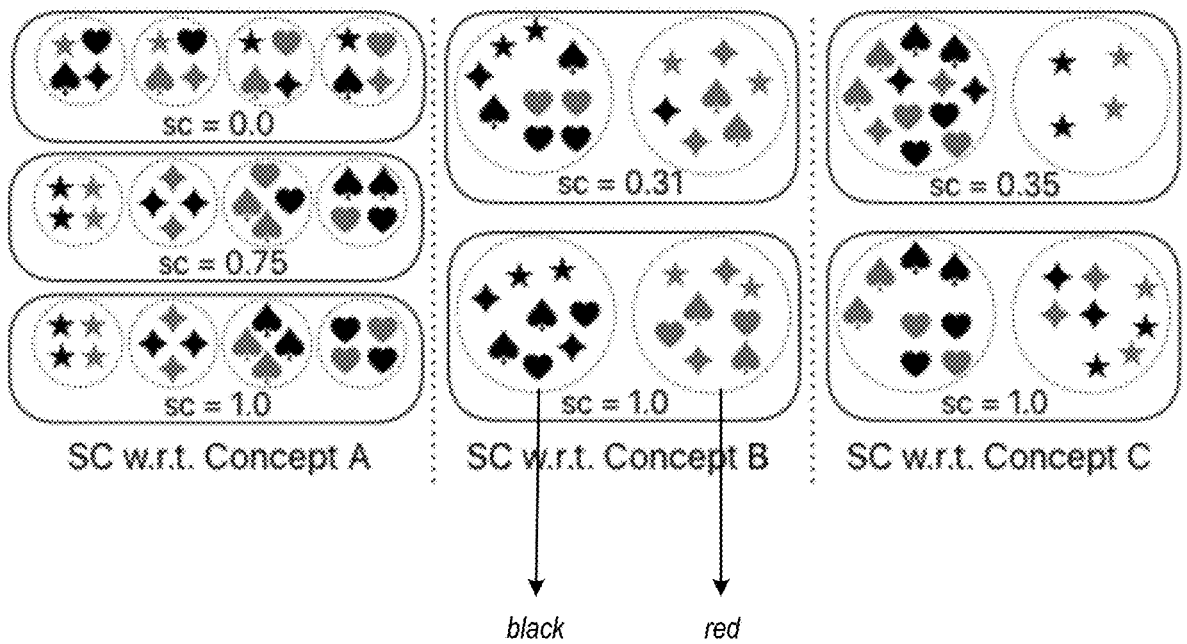

In some embodiments, $S_c^f$ may be maximized when the cluster assignments and the labels are aligned, and is minimized when the cluster assignments offer no information about the labels. In some embodiments, the SCA technique interprets the feature space f by measuring its ability to encode the specified semantic concept (see, e.g., FIG. 3). As shown in FIG. 3, the first column shows three example concepts: shape, colors, and starlikeness. The last three columns in FIG. 3 show examples of clustering and related S scores for each concept. In some embodiments, for convolutional layers, the SCA technique may build the feature space f by performing spatial average pooling or spatial sum pooling. In other embodiments, other types of pooling may be used, such as max-pooling.

In an alternative embodiment, the SCA technique may employ a different type of Semantic Coherence score, which is computed from an "analysis of similarity" (ANOSIM) of the output features of a given layer. In this example, computing the ANOSIM score does not involve performing a clustering of the output features of the given layer, or comparing that clustering of the output features to the classes of labeled concepts. Rather, the ANOSIM score measures how well the labeled concept classes are separated in the features produced by a given layer in the DNN. Thus, the ANOSIM score is computed based on the output features of the layer itself, without examining the mutual information or dependency between two distributions.

In some embodiments, the ANOSIM score is computed by the formula $$S_c^f = \frac{\bar{r}_b - \bar{r}_w}{M/2}.$$

In the formula, $\bar{r}_b$ is the average distance of all sample pairs $f_i$ and $f_j$ such that $c_i \neq c_j$, and $\bar{r}_c$ is the average distance of all sample pairs $f_i$ and $f_j$ such that $c_i = c_j$. The variable M in the formula is the number of distinct pairs in the output feature samples or $$\binom{n}{2}.$$

Figure 4A:
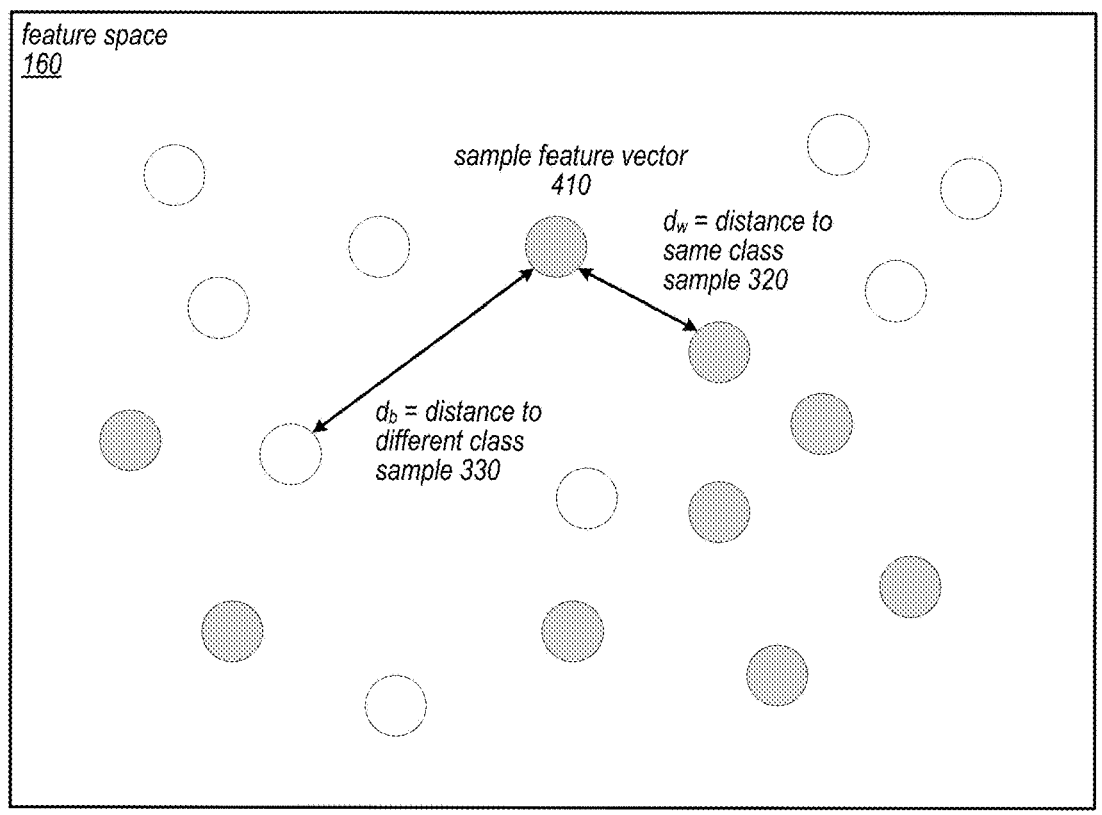
FIGS. 4A and 4B illustrate two techniques of using an analysis of similarity (ANOSIM) score to perform SCA of a neural network layer, according to some embodiments.

The distance values are illustrated in FIG. 4A. As shown, in feature space 160, a number of output feature vectors are shown as individual dots. Differently colored dots belong to different concept classes, and same colored dots belong to same concept classes. The distances are calculated for all pairs of dots in the feature set 160. As may be understood, the value of $S_c^f$ increases when the average distance between same-class samples are small, and the average distance between different-class samples are large. Thus, $S_c^f$ is a measure of how well the feature samples produced by the given layer are separated in terms of the desired concept classes. A given layer with a high value of $S_c^f$ will produce a highly pure feature space for the desired concept classes.

In some embodiments, the similarity of two samples may be calculated as the distance between two samples, for example, the Euclidean distance between two feature vectors. In some embodiments, instead of using the raw distance to compute the averages, the distances of all sample pairs are sorted and ranked, and the average is computed using the rank values. The use of ranks instead of absolute distance values prevents a few large distance values from dominating the average. Use of the rank also provides the added advantage of allowing different layers to be compared (even between different neural networks). On the other hand, a score based on the absolute distance cannot be easily compared due to the different geometry of distinct feature spaces. Further, the M value is used to normalize the difference between the two averages, so that the resulting value of $S_c^f$ always falls between −1 and 1, regardless of the number of feature samples.

In some embodiments of the SCA technique, the ANOSIM score may be a more preferred Semantic Coherence metric over the mutual information score. In one respect, some embodiments of the mutual information score may be impacted by the spatial pooling operation applied to the original feature space. As the layers in the DNN increase in channels and decrease in feature dimensions, the mutual information score may also increase based on these changes in structure. These changes in structure may skew the mutual information score in unintended and undesirable ways. On the other hand, the ANOSIM score is not affected by the differences in layer structure from one layer to the next, and so it may be seen as a purer measure of coherency. Moreover, as may be understood, computation of the ANOSIM score does not require the output features of the layer to be clustered. In some embodiments, the avoidance of clustering may result in a small performance improvement in the computation process.

Figure 4B:
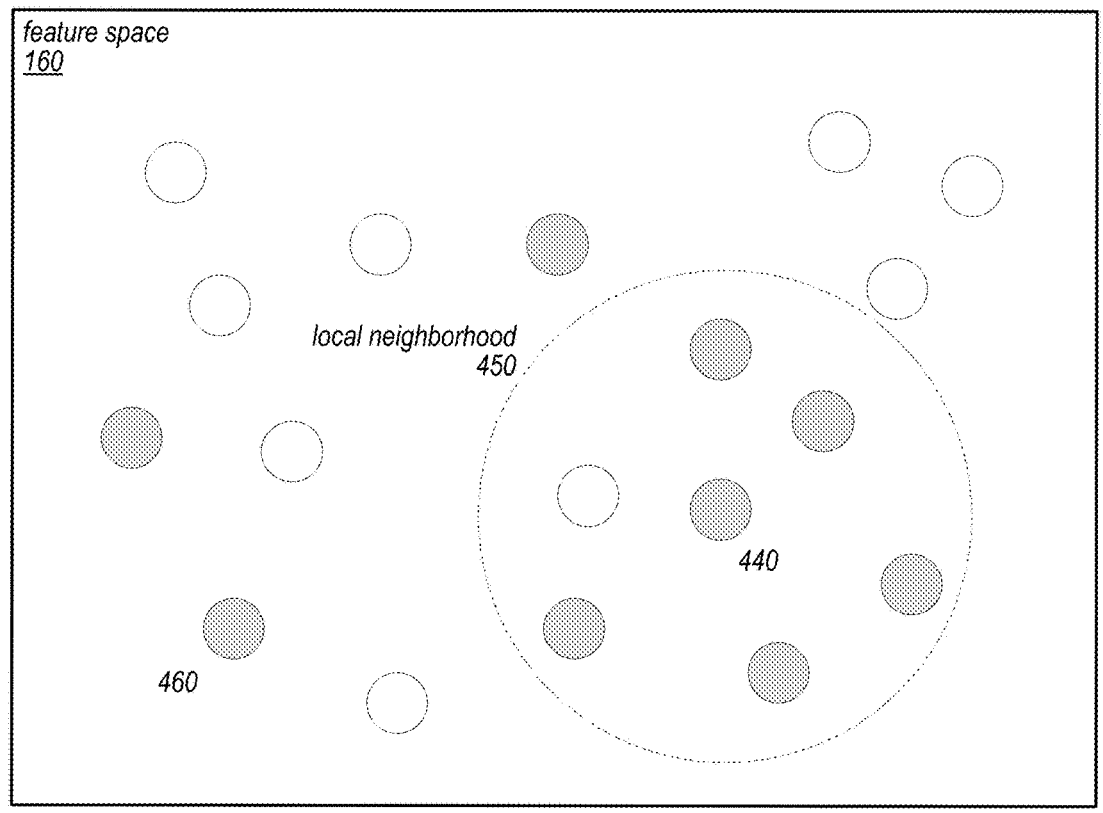

FIG. 4B illustrates a variation in the ANOSIM score technique, where the average distances $\bar{r}_b$ and $\bar{r}_c$ and only calculated from a feature vectors within a specific local neighborhood 350 of each other. In some embodiments, the local neighborhood of a feature vector may be defined by a radius around that feature vector. In some embodiments, the local neighborhood may be defined by a specified number of closest neighbors, independently from how far they are from the subject vector. As shown, the local neighborhood 360 of feature vector 340 only includes a subset of the output feature vectors, and only the distances between these pairs are used to compute the two averages. On the other hand, the distance between feature vectors 340 and 360 are not used to compute the averages, because they are not in the same local neighborhood. This approach is preferred because, in some cases, it may not matter that all pairs of same-class feature vectors are close together or far apart in the feature space. The important thing to measure is whether the feature space is able to clearly separate feature vectors that are close together (i.e. in a neighborhood) based on their concept class. For example, the local neighborhood approach is particularly useful in situations where a concept class forms a multi-modal distribution, where the modes (or clusters) are "pure" in that they contain samples of the same class, but are separated by samples of other classes. Moreover, the limiting of the distance calculations to only local neighborhoods reduces the amount of computation that are needed to compute the coherence score.

Example Machine Learning Models Developed Using SCA-Selected Layers

As discussed, the SCA technique may be used in various contexts to assign a coherence to individual layers of a trained neural network, which can then be used to select an intermediate layer in the network as a basis for further machine learning. The SCA technique allows model developers to select the most promising layer in the neural network as a starting point for learning new concepts. By using these selected intermediate layers, new models can be developed much more quickly, without having to train models to relearn basic concepts that have already been learned in existing models.

Figure 2B:
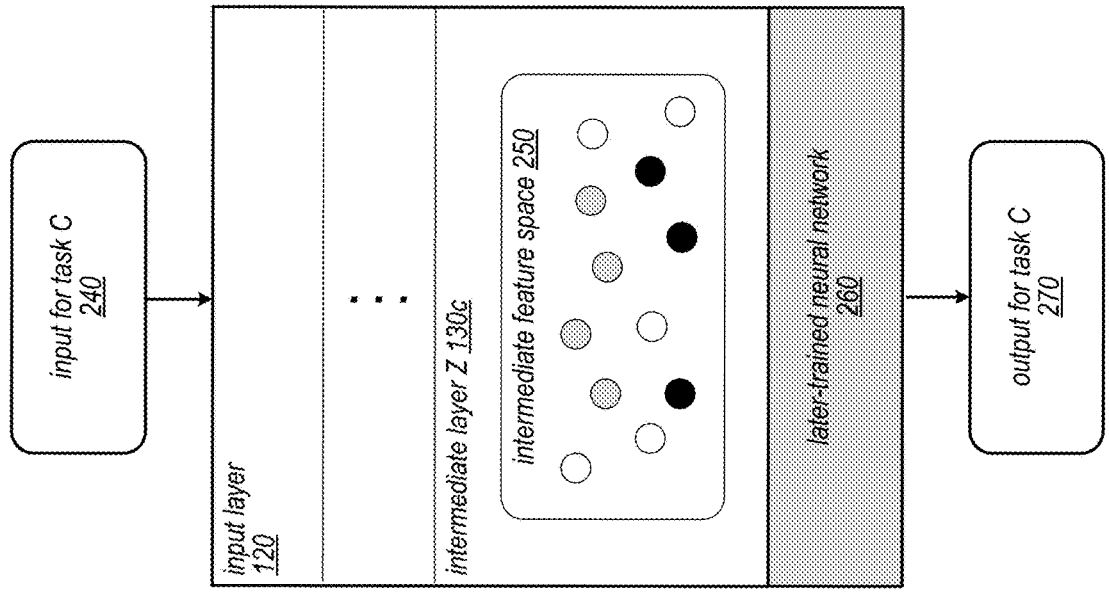
FIGS. 2A and 2B illustrate machine learning models that are developed based on an intermediate layer of a trained neural network selected using SCA, according to some embodiments.
Figure 2A:
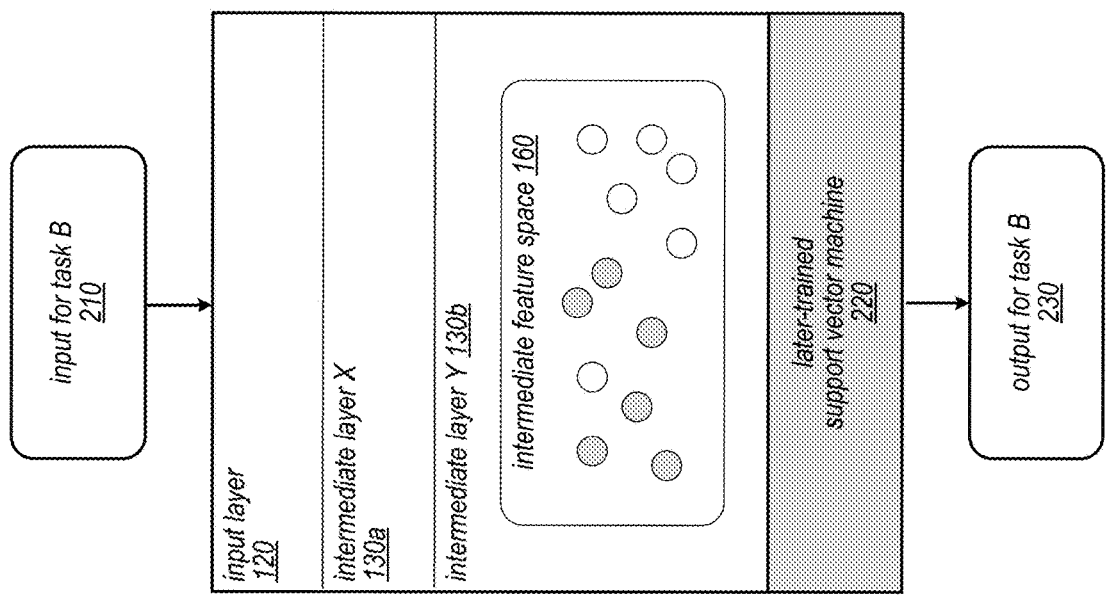

As shown in FIG. 2A, a new model is created from the intermediate layer Y 130b seen in FIG. 1. In this example, layer 130b is selected to be the best layer for new task B 210, based on its coherence score relative to the other layers of the trained network. As shown, in this example, a support vector machine (SVM) 220 is trained at a later time subsequent to the initial training of the network 110. The SVM may be trained specifically to adapt the output features 160 of layer Y to produce the output for task B 230. For example, the trained neural network may have been trained to perform a task such as facial recognition. As part of its training, the network has also learned to determine the relative age of a person based on a facial image. An SCA may reveal that this concept is best captured in intermediate layer Y. As a result, an SVM may be developed to decode the output features of layer Y into a classification of age categories.

As may be appreciated by those skilled in the art, SVMs may be trained to perform a variety of tasks including both classification and regression analysis based on a set of input features. The SVM 220 may be trained using supervised learning using of additional labeled input. In many contexts, an SVM may be trained more quickly than larger models such as DNNs.

As shown in FIG. 2B, another machine learning model is shown that uses the output features 250 of another intermediate layer Z 130c to train another neural network 260. Again, the intermediate layer Z may be chosen based on a coherence score generated by an SCA. In this example, the later-trained neural network 260 may include additional neural network layers, which analyzes the output generated by intermediate layer Z to produce output for new task C 270. By using intermediate layer Z and its earlier layers in the trained network, a new machine learning model for task C constructed much more quickly (and achieve more accuracy) than if the model was to be trained from scratch.

Those skilled in the art will appreciate that this technique to select intermediate layers may be used in a variety of situations to reuse previously trained neural networks to quickly compose new machine learning models. As another example, a previously trained neural network may be augmented over time to perform additional tasks by selecting the best intermediate layer from which to learn the new task. For example, a neural network originally trained to recognize traffic signs in one country may be augmented over time to recognize traffic signs in other countries. As another example, intermediate layers from multiple trained neural networks that produce pure feature clusters for basic concepts may be combined to construct a new model for making more sophisticated decisions. The SCA layer analysis technique thus unlocks the vast knowledge contained in past neural networks, to allow this knowledge to be used for new machine learning tasks.

Example Application of the SCA Technique in Few-Shot Learning

The layer scoring produced by SCA can be used in a number of interesting ways. For example, the SCA technique may be leveraged to perform few-shot learning in a Few-Shot Omniglot study. In some embodiments, a pre-trained network for natural image classification may be used to classify handwritten characters in the Omniglot dataset. In some embodiments, the Omniglot dataset may include a collection of handwritten characters composed of two disjoint sets: the background set is composed of 964 unique symbols across 30 alphabets (20 images per symbol); the test set contains 659 unique symbols across 20 alphabets (20 images per symbol). Note that the trained network in this case was not explicitly trained to recognize handwritten characters.

In this example, the SCA technique may be applied on the background set in order to understand which layer of the network best clusters handwritten characters. For the classification task, only the test set is used, which may be split into a training set of 10 images per symbol and an actual test set with the reminder 10 images. In some embodiments, a support vector machine (SVM) classifier or a logistic regression classifier is then trained using the feature space produced by the SCA-selected layer and, as a baseline, the feature space produced by the last layer (as frequently done in transfer learning). By using the SVM or logistic regression classifier, the output features of the SCA-selected layer and the last layer may be mapped into output classifications (e.g., handwritten characters), and the performance of these two layers for the new classification task may be measured and compared.

Figure 5A:
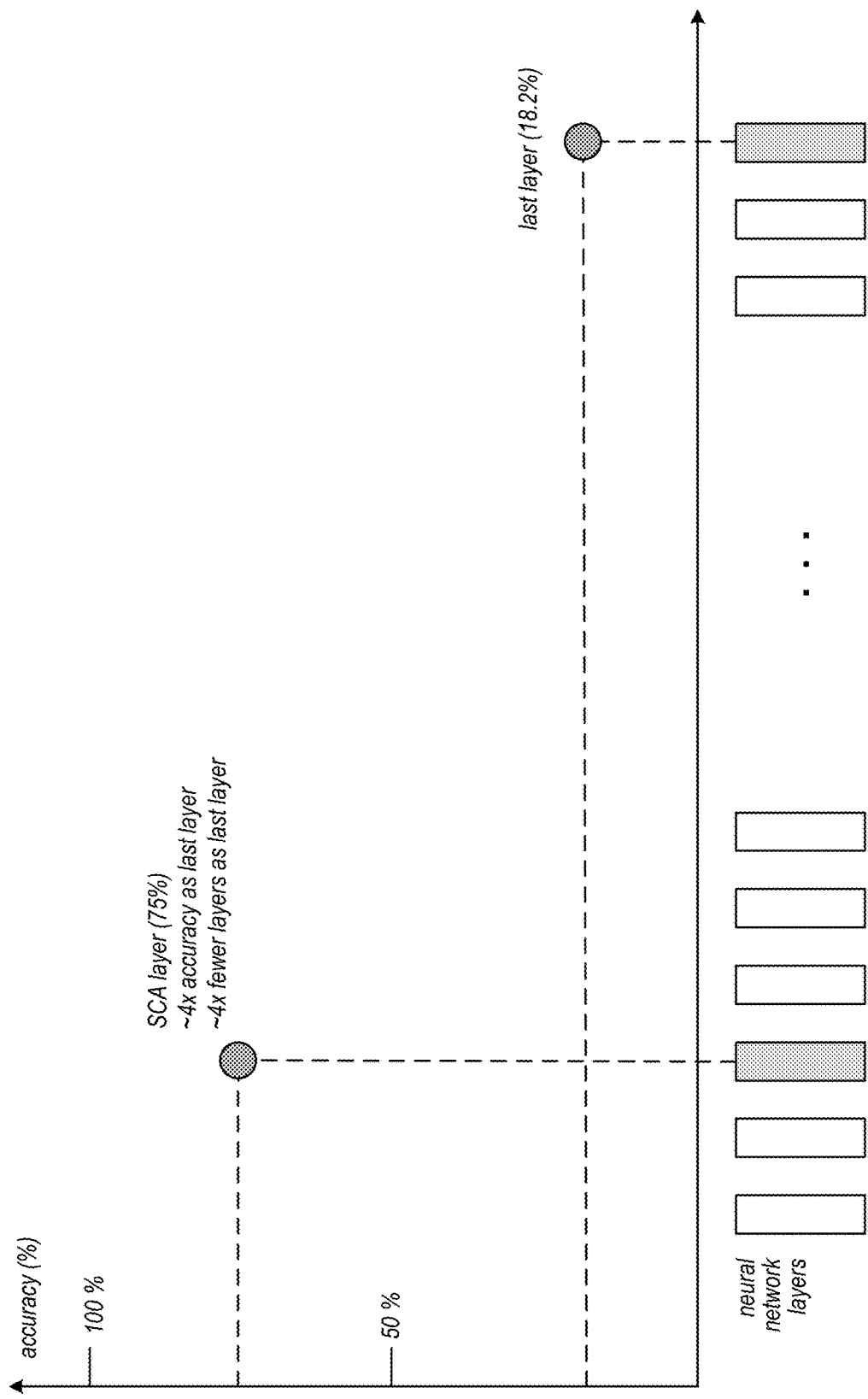
FIGS. 5A and 5B illustrate accuracy results for an example character classification task when using embedding of the last layer as compared to an SCA-selected layer, according to some embodiments.
Figure 5B:
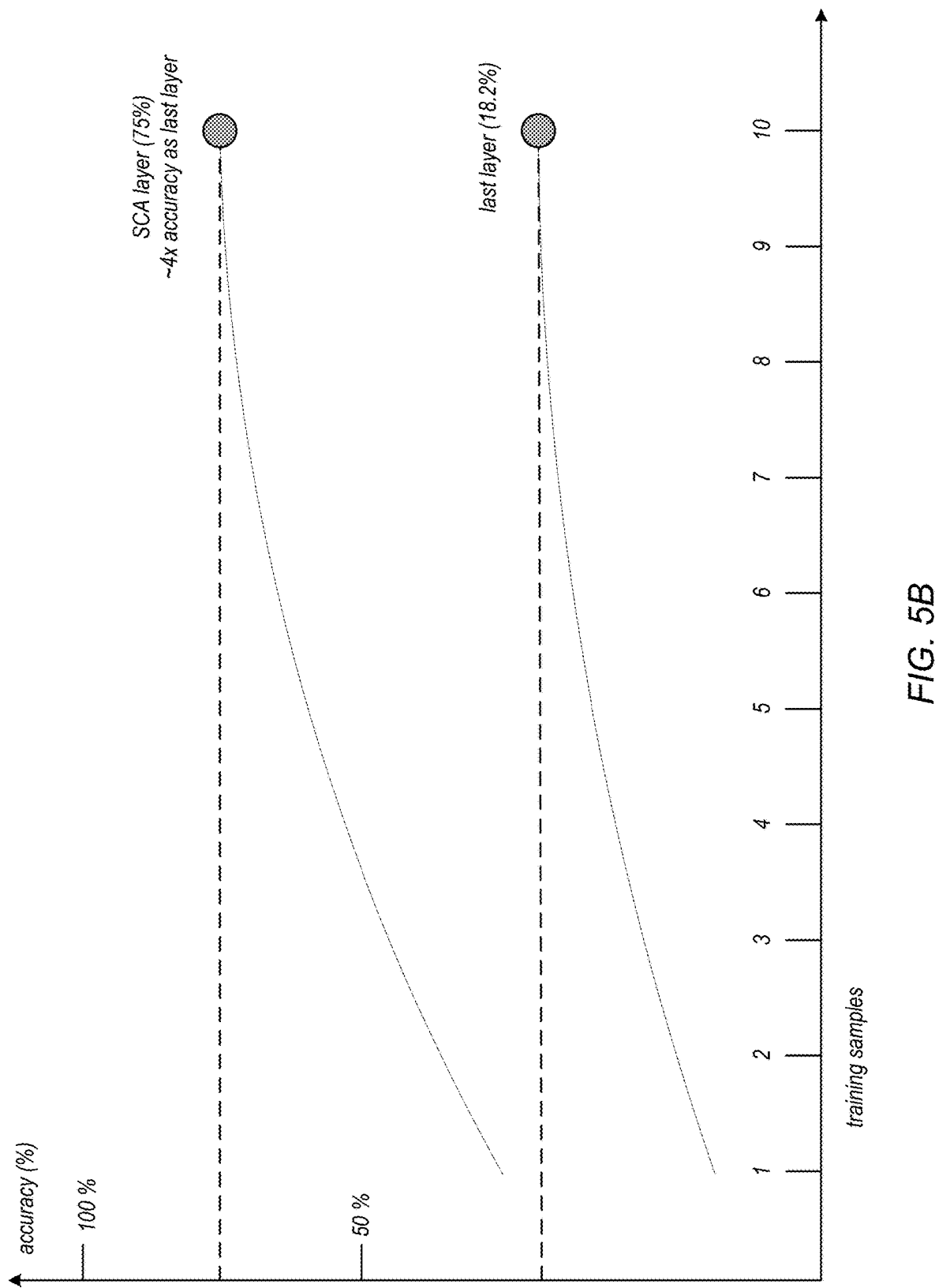
Figure 5C:
FIG. 5C shows 2D projection of the manifold generated by the SCA-selected layer and the last layer in a neural network, according to some embodiments.

The results of this comparison (see FIG. 5A) show that the classifier that uses the SCA-selected layer produces 4× higher accuracy and uses a 4× less layers for inference compared to the classifier that uses the last layer. In FIG. 5A, a graph of accuracy versus layers in a neural network is shown for a few-shots learning application with 659 classes and 10 images per class. FIG. 5B shows how the classification accuracy changes as a function of the training set size, for the same few-shots learning application. In this example, the SCA-based classifier is consistently more accurate than the one based on the last layer. These results indicate that SCA can be used to find an intermediate layer that better encodes the desired concept than the last layer, using fewer samples to achieve better performance. These results in example are corroborated by the data manifold visualizations in FIG. 5C, which shows that the SCA-selected layer is visibly more coherent with the concept of character than the last layer. In FIG. 5C, the data points are color coded per their character class.

Example Application of the SCA Technique in DNN-Based Cameras

In some embodiments, the SCA technique may be used in other applications such as designing camera optimized for image processing DNNs. In some embodiments, such cameras require the careful selection and tuning of image signal processing (ISP) modules. This process can be informed by sensitivity analysis (what ISP issues affect DNNs?) and root cause error analysis (what DNN failures are caused by ISPs?). In some embodiments, an SCA technique may be used to address both questions by computing the $S_c^f$ score of layers of a pre-trained image processing neural network with respect to two concepts: ISP Issue and Image Content, both specified using a dataset of simulated ISP issues. The results of this study indicate that the layers become less sensitive to ISP Issue and more sensitive to Image Content with depth. These results corroborate the hypothesis that early layers tend to encode natural image statistics and deeper layers tend to encode higher level semantics. In some embodiments, the most sensitive to Image Content still showed some sensitivity to ISP Issue. The results further reveal that FPNs (fixed pattern noise in low light) and SALT (shot noise in low light) are potentially detrimental to the DNN's generalization to semantic image content.

In one study, the DNN layer with the highest $S_c^f$ score with respect to ISP Issue is best for root cause error analysis. In some embodiments, when processing problematic frames, this layer forms clusters of failures associated with similar ISP issues. In one study for an object detection task, the results showed clusters of detection errors associated with FPNs created by this layer.

Accordingly, the disclosed SCA technique may be used to evaluate features spaces produced by layers in a DNN for their ability to encode useful concepts, and may be used to map concepts to feature spaces. In some embodiments, when the feature spaces are the output of intermediate layers of a DNN, embodiments of the SCA technique may be used to reveal part of DNN hidden knowledge. In some embodiments, the resulting mapping can be useful for many applications, for example, in an application that uses a few-shot learning based on transfer learning in order to identify which layer of the network is most suited to solve a task. In some embodiments, the SCA-selected layer showed consistent improvement over the last layer as is frequently done in transfer learning. In some embodiments, SCA techniques may be used to perform sensitivity analysis and root cause error analysis for image processing DNNs.

Study Results of the SCA Technique

Under one study, the benefits of the ANOSIM score were used to select different layers in the image analysis network ResNet26. Different feature extraction heads were applied to the selected layers for different types of concept classes. In the study, the concept classes were taken as the labels of different datasets in the Visual Decathlon Challenge, and the study used a ResNet architecture pertained on the ImageNet database. The study showed that the ANOSIM score correlated well with the accuracy of the of the output results.

The study investigated different types of pooling. In average pooling, some spatial information is lost from one layer to the next, and this type of pooling favors later layers of the network. In a fair pooling method, adaptive average pooling and feature flattening are used to maintain feature dimensions in individual layers that are approximately equal to the size of the last layer, and to preserve some spatial information at every layer.

Table 1 below shows the results of the SCA-based feature extractors and optimal pooling results on the validation set of the Visual Decathlon Challenge compared with some state of the art 1× parameter count methods submitted to the Visual Decathlon Challenge.

TABLE 1

Visual Decathlon Results

| Method | Average # Params | Score |
|---|---|---|
| Feature Extractor (Penultimate) | 1.0x | 544 |
| Optimal Average Pooling | 0.90x | 1298 |
| Optimal Fair Pooling | 0.67x | 1326 |
| SCA Average Pooling | 0.90x | 1288 |
| SCA Fair Pooling | 0.91x | 1264 |

Table 2 below shows the number of seconds taken for performing SCA with up to 10,000 data samples from the training set of the new task versus training a linear classifier on the provided training set of the new task for new datasets in the Visual Decathlon Challenge.

TABLE 2

Number of Seconds Per Layer

| Time | Airc | C100 | DPed | DTD | GTSR | Flwr | Oglt | SVHN |
|---|---|---|---|---|---|---|---|---|
| Best | 21.53 | 132.58 | 6.12 | 16.05 | 184.56 | 13.03 | 2843 | 161.71 |
| SCA | 1.95 | 23.38 | 22.69 | 0.46 | 22.46 | 0.10 | 23.42 | 22.34 |

Tables 3 and 4 below show results by dataset for the two types of pooling.

TABLE 3

Average Pool Results by Dataset

| Time | Airc | C100 | DPed | DTD | GTSR | Flwr | Oglt | SVHN |
|---|---|---|---|---|---|---|---|---|
| Best | 20.82 | 66.87 | 96.84 | 50.74 | 86.61 | 71.99 | 37.00 | 50.97 |
| ΔSCA | 0 | 0 | −0.09 | 0 | 0 | 0 | −4.17 | 0 |
| Corr (ρ) | 0.974 | 0.988 | 0.527 | 0.911 | 0.867 | 0.977 | 0.805 | 0.937 |

TABLE 4

Adaptive Pool Results by Dataset

| Time | Airc | C100 | DPed | DTD | GTSR | Flwr | Oglt | SVHN |
|---|---|---|---|---|---|---|---|---|
| Best | 20.82 | 66.87 | 96.94 | 50.74 | 87.38 | 71.99 | 37.00 | 54.54 |
| ΔSCA | 0 | 0 | −0.19 | 0 | −3.21 | 0 | −4.17 | −3.57 |
| Corr (ρ) | 0.916 | 0.959 | 0.331 | 0.901 | 0.589 | 0.937 | 0.433 | 0.67 |

Figure 6:
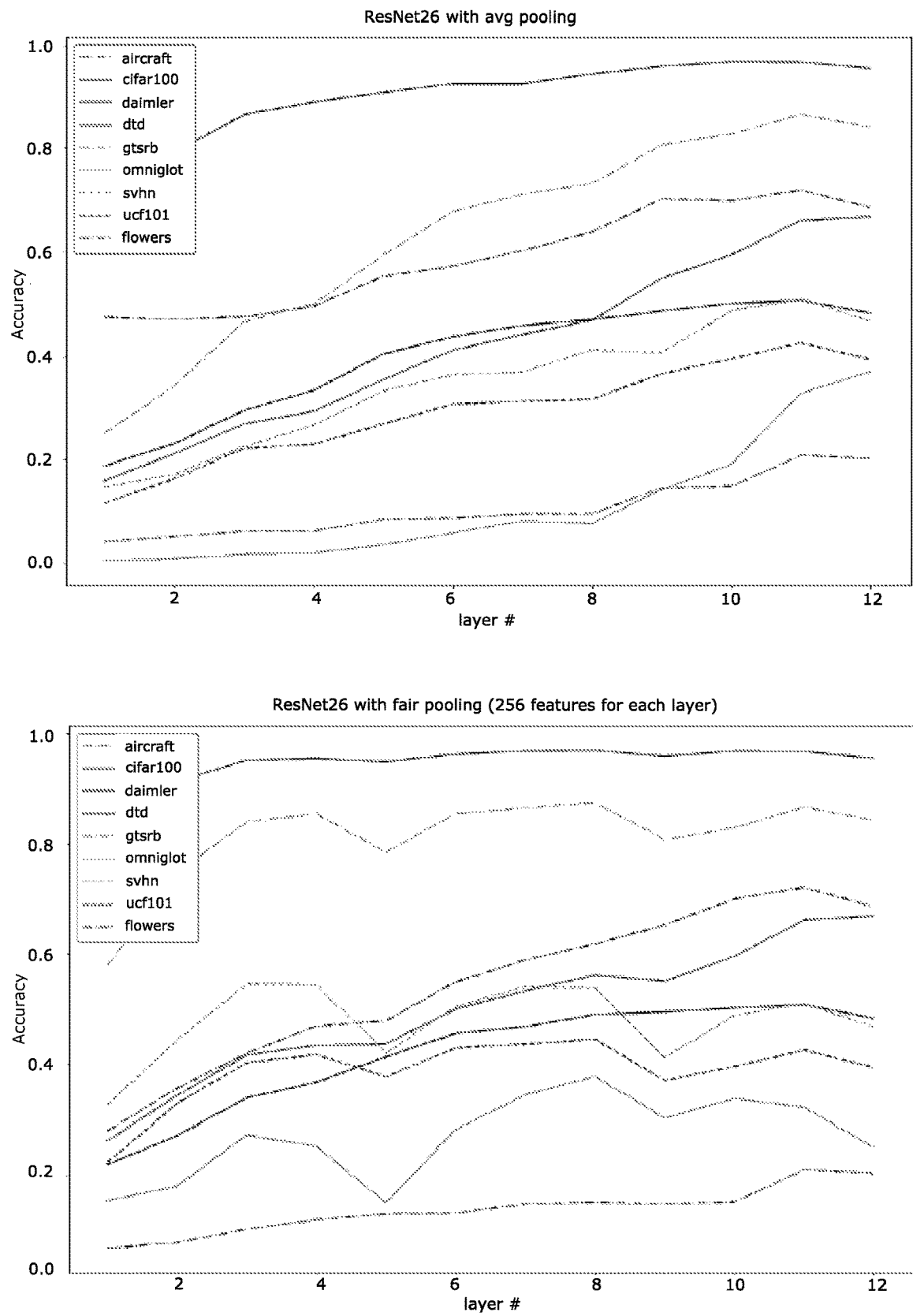
FIG. 6 illustrates accuracy per layer results for different pooling types in an SCA-extended neural network for different types of image inference tasks, according to some embodiments.

Additionally, FIG. 6 shows graphs of indicating the accuracy per layer results of the pooling types as determined during the study.

Example Processes for Performing the SCA Technique

Figure 7:
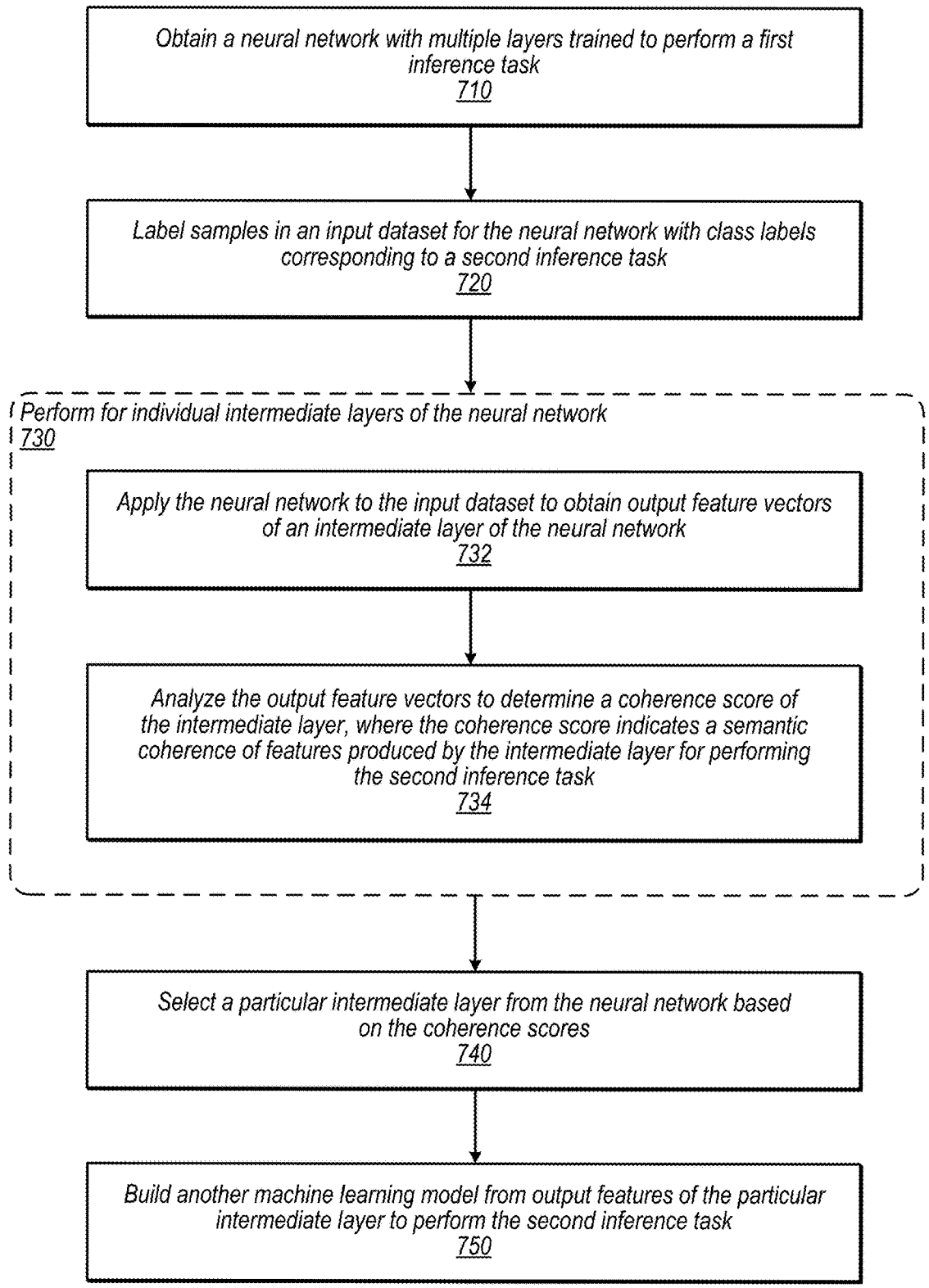
FIG. 7 is a flowchart illustrating a process of selecting an intermediate layer of a neural network using SCA and building another machine learning model based on the selected layer, according to some embodiments.

FIG. 7 is a flowchart illustrating a process of selecting an intermediate layer of a neural network using SCA and building another machine learning model based on the selected layer, according to some embodiments.

The depicted process begins at operation 710, where a previously trained neural network is obtained that has multiple layers trained to perform a first inference task. For example, the trained network may be neural network 110 of FIG. 1. In some embodiments, the neural network may be a convolutional network. The trained network may be organized into layers, so that each layer generates output values that are used as input values by the next layer.

At operation 720, samples in an input dataset are labeled. The input dataset will be used to evaluate the semantic coherence of the network's layers for a second inference task. The second inference task may involve inference of a new concept that the neural network was not explicitly trained for. However, as discussed, in some cases a neural network may learn different concepts during the course of a training for an explicit task. The input samples may be labeled classes labels for the new concept. These labels are used in generating the semantic coherence score for an individual network layer.

As shown, operations 732 and 734 are part of a semantic coherency analysis process 730 that is performed for individual layers of the neural network. In some embodiments, the analysis process 730 may be orchestrated by a software program to be performed systematically for the neural network.

At operation 732, the neural network is applied to the input data set to obtain output features vectors of an intermediate layer. In some embodiments, the output feature vectors may be generated by injecting instrumentation code to the model execution software to, for example, generate output from the particular layer. In some embodiments, the generated output may be captured in a data file. The output feature vectors may be generated so that they are associated with the particular input sample and the class label of the particular input sample.

At operation 734, the output feature vectors are analyzed to determine a coherence score of the intermediate layer. The coherence score will indicate a semantic of features produced by the intermediate layer for performing the second inference task. In some embodiments, the coherence score may be normalized in some manner so that they can be meaningfully compared for individual layers of the neural network. For example, the normalization may be performed to account for the different number of output feature vectors that are produced by the different layers. In some embodiments, the semantic coherence score may be a mutual information metric. In some embodiments, determination of the mutual information metric may include performing a clustering the output feature vectors according to a clustering technique, such as K-Means clustering, mean shift clustering, density-based spatial clustering, and the like. In some embodiments, the semantic coherence score may not involve a clustering of the output features of the intermediate layer. For example, in some embodiments, the semantic coherence score may be an ANOSIM metric as discussed in connection with FIGS. 4A and 4B. In some embodiments, the ANOSIM metric may be based on a comparison of relative distances between same-class feature vectors and different-class feature vectors.

After semantic coherence scores have been generated for multiple intermediate layers, at operation 740, the scores are used to select a particular intermediate layer of the neural network. For example, in some embodiments, the layer with the highest coherence score may be selected. The selected layer is to be used as a basis to develop another machine learning model for performing the second inference task. In some embodiments, other factors may also be used in the selection, such as the size of the output feature space of the layer. In some embodiments, the selection may be made based on multiple types of semantic coherence scores.

At operation 750, another machine learning model is built to perform the second inference task based on the output features of the selected intermediate layer. The building of the other machine learning model may include training an SVM or additional layers of another neural network, as discussed in connection with FIGS. 2A and 2B.

Figure 8:
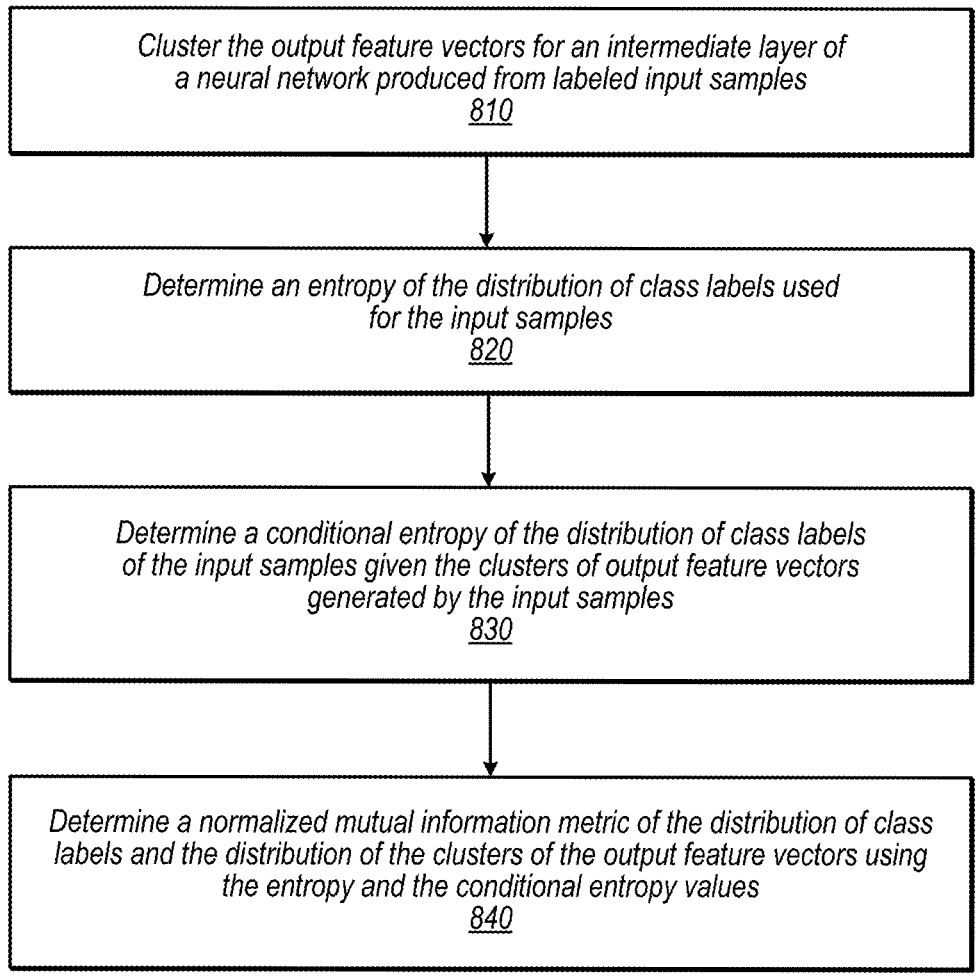
FIG. 8 is a flowchart illustrating a process of computing a mutual information metric used to evaluate neural network layers in SCA, according to some embodiments.

FIG. 8 is a flowchart illustrating a process of computing a mutual information metric used to evaluate neural network layers in SCA, according to some embodiments.

To compute the mutual information metric, at operation 810, the output feature vectors of an intermediate layer being evaluated is clustered. As discussed, the output feature vectors may be generated from a dataset of samples that have been labeled with class labels for a new concept. Depending on the embodiment, the clustering may be performed using a variety of different clustering techniques, such as K-Means clustering, mean shift clustering, density-based spatial clustering, and the like. In some embodiments, the clustering technique used may be configurable by the user. In some embodiments, the clustering may be specified to produce the same number of clusters as the number of distinct class labels used for the input dataset.

At operation 820, an entropy of the distribution of class labels used for the input samples is determined. As may be understood, the entropy of a distribution (here the distribution of class labels over the input samples) may be a measure of uncertainty of the distribution. For a random variable X with n discrete values $\{x_1, \ldots x_n\}$, the entropy of the variable may be computed as $H(X)=-\Sigma_{i=1}^{n}P(x_i)\log P(x_i)$. This entropy value may be calculated from the labeled input dataset itself.

At operation 830, a conditional entropy is determined for the distribution of the class labels of input samples given the clustering of their output feature vectors. As may be understood, the conditional entropy indicates the degree of uncertain of an input sample's class label, when the input sample's cluster is known. If the conditional entropy value is much smaller (much less uncertain) than the entropy value determined in operation 820, this means that the feature vectors produced by the layer has significantly reduced the uncertainty of the distribution of the class labels. A significant reduction thus indicates that the feature space induces highly pure clusters that are coherent with the class labels.

At operation 840, a normalized mutual information metric is determined for the distribution of class labels and the distribution of the clusters, using the two entropy values determined in operations 820 and 830. In some embodiments, the mutual information metric may be determined by subtracting the conditional entropy value from the entropy value. In some embodiments, this mutual information metric may be normalized, so that it can be meaningfully compared across the different layers of the neural network. In some embodiments, the normalized mutual information metric may be computed using the formula $$S_c^f = \frac{H(D_c) - H(D_c \mid D_c^f)}{\sqrt{H(D_c) \cdot H(D_c^f)}}$$

as discussed previously.

Figure 9:
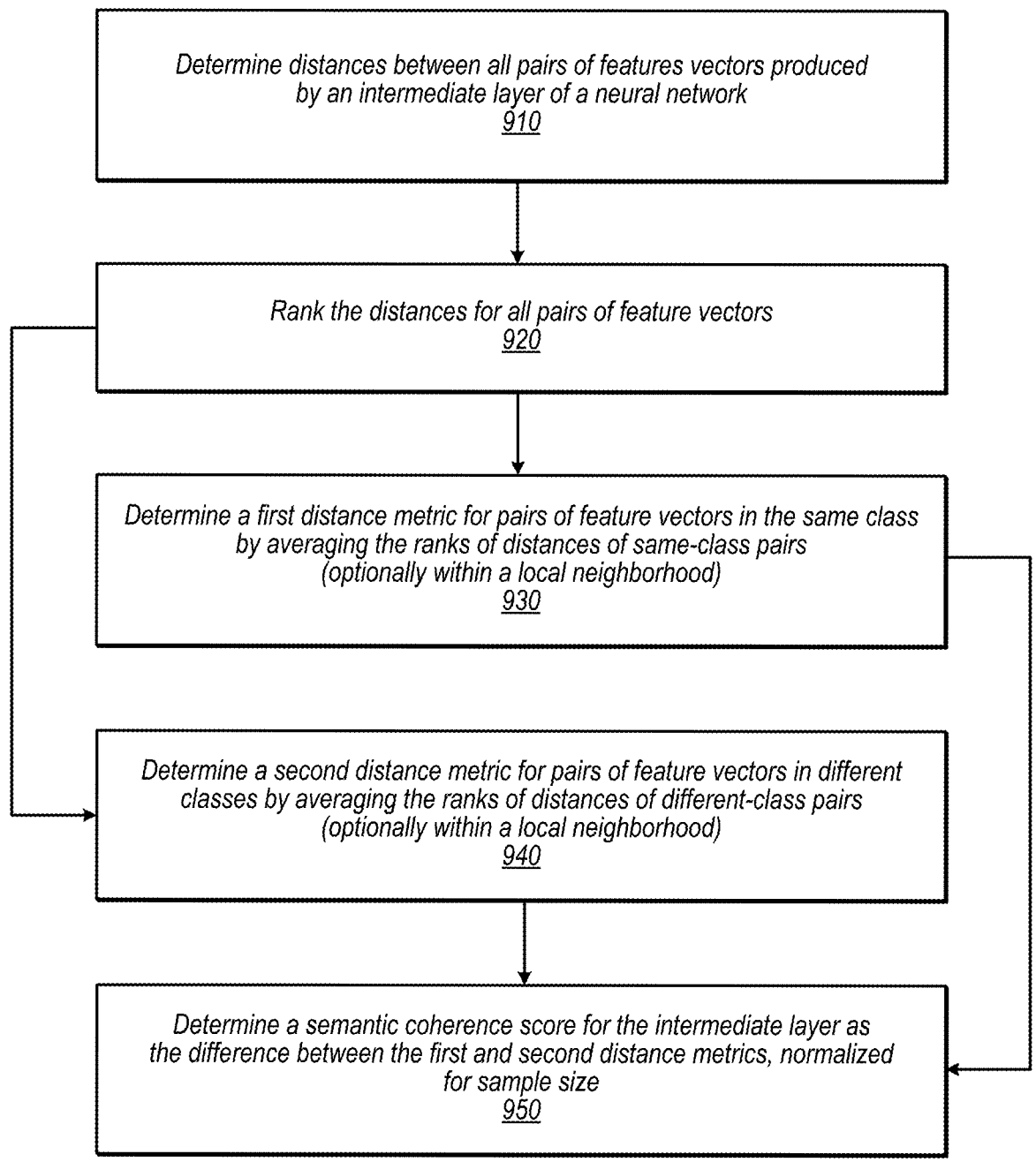
FIG. 9 is a flowchart illustrating a process of computing an ANOSIM metric used to evaluate neural networks in SCA, according to some embodiments.

FIG. 9 is a flowchart illustrating a process of computing an ANOSIM metric used to evaluate neural networks in an SCA, according to some embodiments. As discussed, in some embodiments, the ANOSIM metric may be determined without performing a clustering of the output features of the layer being evaluated.

To compute the ANOSIM metric, at operation 910, distances between all pairs of feature vectors produced by the intermediate layer are determined. Depending on the embodiment, the distances may be determined based on any of a variety of distance metrics, such as Euclidean distance, Hamming distance, or some other type of distance measure.

At operation 920, the pairs of feature vectors are ranked, so that each pair of feature vectors is assigned a rank value against all pairs of feature vectors based on their distance. In some embodiments, this ranking is used in the calculation instead of raw distance values to normalize the distances, so that the calculation will not be dominated by a few pairs with very large distances.

As shown in this example, operations 930 and 940 can be performed in any order, or in parallel. At operation 930, a first distance metric is determined. The first distance metric indicates an average of ranks for all pairs of feature vectors that are in the same class (i.e. generated from input samples labeled with the same class label). This average value represents the closeness of same-class feature vectors in the intermediate layer's output space. A small average value for same-class feature vectors indicates high semantic coherence of the output feature vectors. In some embodiments, the average may be computed for only a subset of the output feature vectors that are within a local neighborhood of each other, as discussed in connection with FIG. 4B. In this manner, the evaluation only examines how well a feature vector is separated from other classes in its local neighborhood. In some embodiments, this restriction may speed up the generation of the distance metric. In some embodiments, the ranking of the feature vector pairs may also be done only locally, and not globally as in operation 920.

At operation 940, a second distance metric is determined. This second distance metric indicates an average of ranks for all pairs of feature vectors that are in different classes. A large average value for different-class feature vectors indicates high semantic coherence of the output feature vectors. As with the first distance metric, calculation of this second distance metric may be limited to feature vector pairs within a local neighborhood.

After operations 930 and 940, the process proceeds to operation 950, where the semantic coherence score (the ANOSIM score) is determined for the intermediate layer. The ANOSIM score may be determined by calculating a difference between the first and second distance metrics, and normalizing the difference for sample size. In some embodiments, the ANOSIM metric may be determined according to the formula $$S_c^f = \frac{\bar{r}_b - \bar{r}_w}{M/2},$$

as discussed previously in connection with FIGS. 4A and 4B.

Example Computer System for Implementing the SCA Technique

Figure 10:
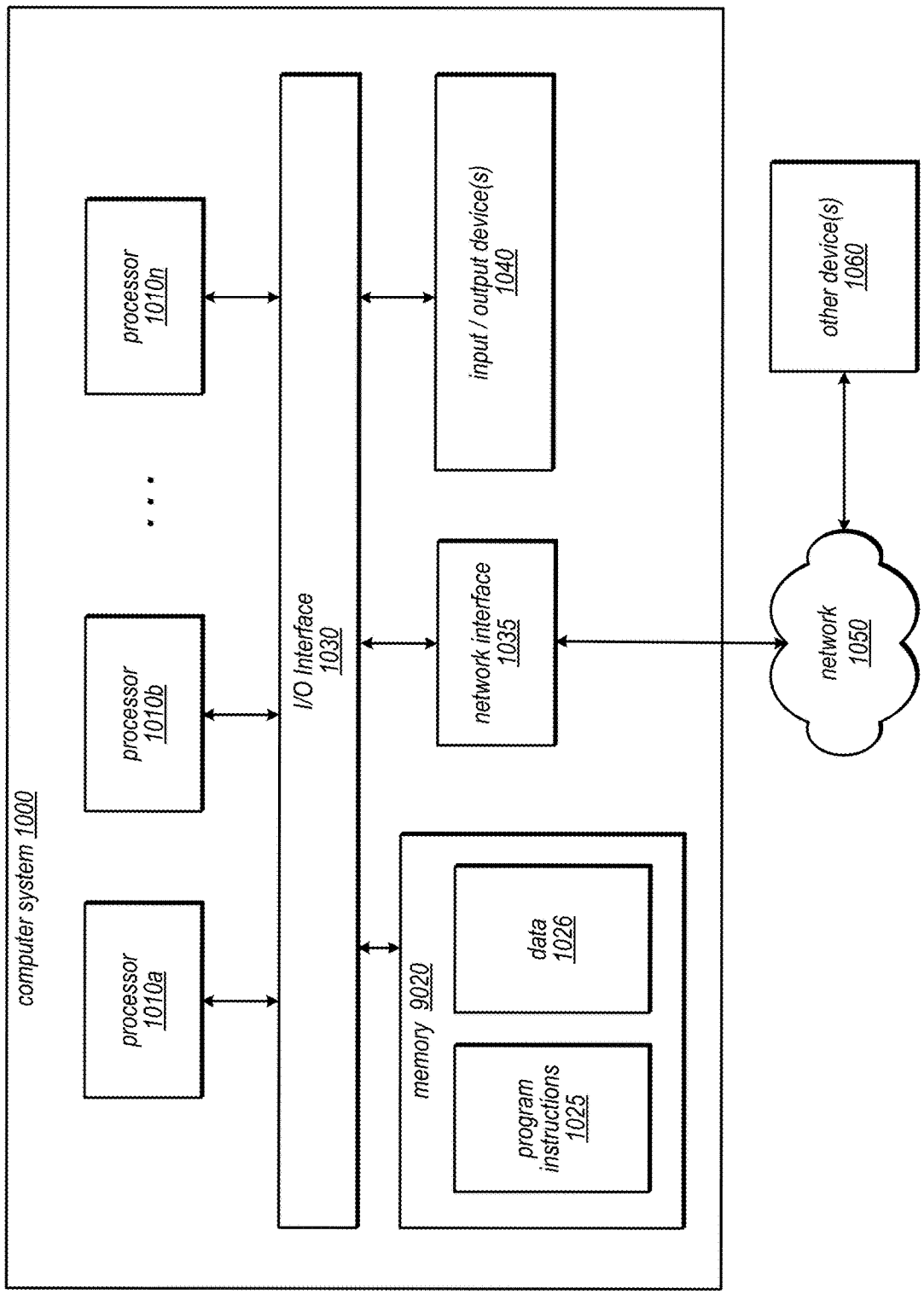
FIG. 10 illustrates an example computer system that may be used to implement portions of an SCA system for neural network layers, according to embodiments.

FIG. 10 illustrates an example computing device, referred to as computer system 1000, that may include or host embodiments of an SCA-based DNN analysis system (e.g. the semantic coherence analyzer 150) as discussed in connection with FIGS. 1 through 9.

In the illustrated embodiment, computing device 1000 includes one or more processors 1010 coupled to a main memory 1020 (which may comprise both non-volatile and volatile memory modules, and may also be referred to as system memory) via an input/output (I/O) interface 1030. Computing device 1000 further includes a network interface 1040 coupled to I/O interface 1030, as well as additional I/O devices 1035 which may include sensors of various types.

In various embodiments, computing device 1000 may be a uniprocessor system including one or more processors 1010a, 1010b, 1010c, etc., which may be implemented as multiprocessor system. Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some implementations, graphics processing units (GPUs) may be used instead of, or in addition to, conventional processors.

Memory 1020 may be configured to store instructions and data accessible by processor(s) 1010. In at least some embodiments, the memory 1020 may comprise both volatile and non-volatile portions; in other embodiments, only volatile memory may be used. In various embodiments, the volatile portion of system memory 1020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (Re-RAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions 1025 and data 1026 implementing one or more desired functions, such as those methods, techniques, and data described above, are shown stored different sections within main memory 1020.

Network interface 1035 may be configured to allow data to be exchanged between computing device 1000 and other devices 1060 attached to a network or networks 1050, such as other computer systems or devices as illustrated in FIGS. 1 through 9 for example. In various embodiments, network interface 1040 may support communication via any suitable wired or wireless general data networks, such as types of Ethernet network, for example. Additionally, network interface 1035 may support communication via telecommunications/telephony networks such as analog voice networks or digital fiber communications networks, via storage area networks such as Fibre Channel SANs, or via any other suitable type of network and/or protocol.

The various methods and/or techniques as illustrated in the figures and described herein represent exemplary embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended to embrace all such modifications and changes and, accordingly, the above description to be regarded in an illustrative rather than a restrictive sense.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method comprising:
    obtaining a neural network having a plurality of layers that was trained to perform a first inference task;
    labeling individual samples in an input dataset for the neural network with class labels for a second inference task to assign the individual samples to classes corresponding to the second inference task;
    applying the neural network to the input dataset to obtain intermediate feature vectors for the first inference task from an intermediate layer of the plurality of layers;
    clustering the intermediate feature vectors into a plurality of clusters;
    comparing the clusters of intermediate feature vectors for the first inference task with the classes of samples labeled according to the class labels for the second inference task to determine a coherence score of the intermediate layer, wherein the coherence score indicates a semantic coherence of features produced by the intermediate layer for performing the second inference task; and
    outputting the coherence score for the intermediate layer.

2. The method of claim 1, comprising:
    determining respective coherence scores for multiple ones of the plurality of layers; and
    selecting a particular intermediate layer from the multiple layers based at least in part on their respective coherence scores; and
    building another machine learning model from intermediate features output by the particular intermediate layer to perform the second inference task.

3. The method of claim 2, wherein building the other machine learning model comprises training a support vector machine (SVM) for the intermediate features output by the particular intermediate layer to perform the second inference task.

4. The method of claim 2, wherein building the other machine learning model comprises training another neural network, wherein the other neural network is configured to receive the intermediate features output by the particular intermediate layer to perform the second inference task.

5. The method of claim 2, wherein building the other machine learning model comprises adding one or more additional layers to the neural network, wherein the one or more additional layers are configured to receive the intermediate features output by the particular intermediate layer to generate additional output classes.

6. The method of claim 2, wherein:
    the first inference task is a first image classification task; and
    the second inference task is a different image classification task to classify images to a different set of classes.

7. The method of claim 1, wherein the clustering is performed using a k-means clustering technique, a mean shift clustering technique, or a density-based spatial clustering technique.

8. The method of claim 1, wherein determining the coherence score comprises:
    determining an entropy of a first distribution of the class labels over the samples in the input dataset;
    determining a conditional entropy of a second distribution of the class labels over the individual samples in the input dataset given respective clusters assigned to the individual samples' intermediate feature vectors; and
    subtracting the conditional entropy from the entropy to determine a mutual information metric for the first and second distributions.

9. The method of claim 8, wherein determining the coherence score comprises:
    normalizing the mutual information metric for a number of intermediate feature vectors produced by the intermediate layer.

10. One or more non-transitory computer-accessible storage media storing program instructions that when executed on or across one or more processors implement neural network analysis system and cause the neural network analysis system to:
    obtain a neural network having a plurality of layers that was trained to perform a first inference task;
    obtain an input dataset for the neural network, wherein individual samples in the input dataset are labeled with class labels for a second inference task that assign the individual samples to classes corresponding to the second inference task;
    apply the neural network to the input dataset to obtain intermediate feature vectors for the first inference task from an intermediate layer of the plurality of layers;
    cluster the intermediate feature vectors into a plurality of clusters;
    compare the clusters of intermediate feature vectors for the first inference task with the classes of samples labeled according to the class labels for the second inference task to determine a coherence score of the intermediate layer, wherein the coherence score indicates a semantic coherence of features produced by the intermediate layer for performing the second inference task; and
    output the coherence score for the intermediate layer.

11. The one or more non-transitory computer-accessible storage media of claim 10, wherein the program instructions when executed on or across the one or more processors cause the neural network analysis system to:
    determine respective coherence scores for multiple ones of the plurality of layers; and select a particular intermediate layer from the multiple layers for building another machine learning model based at least in part on their respective coherence scores.

12. The one or more non-transitory computer-accessible storage media of claim 10, wherein to determine the coherence score, the program instructions when executed on or across the one or more processors cause the neural network analysis system to perform the clustering of the intermediate feature vectors using a k-means clustering technique, a mean shift clustering technique, or a density-based spatial clustering technique.

13. The one or more non-transitory computer-accessible storage media of claim 10, wherein to determine the coherence score, the program instructions when executed on or across the one or more processors cause the neural network analysis system to:
  determine an entropy of a first distribution of the class labels over the samples in the input dataset;
  determine a conditional entropy of a second distribution of the class labels over the individual samples in the input dataset given respective clusters assigned to the individual samples' intermediate feature vectors; and
  subtract the conditional entropy from the entropy to determine a mutual information metric for the first and second distributions.

14. The one or more non-transitory computer-accessible storage media of claim 13, wherein to determine the coherence score, the program instructions when executed on or across the one or more processors cause the neural network analysis system to normalize the mutual information metric for a number of intermediate feature vectors produced by the intermediate layer.

15. A system, comprising:
  one or more hardware processors with associated memory that implement a neural network analysis system, configured to:
    obtain a neural network having a plurality of layers that was trained to perform a first inference task;
    obtain an input dataset for the neural network, wherein individual samples in the input dataset are labeled with class labels for a second inference task that assign the individual samples to classes corresponding to the second inference task;
    apply the neural network to the input dataset to obtain intermediate feature vectors for the first inference task from an intermediate layer of the plurality of layers;
    cluster the intermediate feature vectors into a plurality of clusters;
    compare the clusters of intermediate feature vectors for the first inference task with the classes of samples labeled according to the class labels for the second inference task to determine a coherence score of the intermediate layer, wherein the coherence score indicates a semantic coherence of features produced by the intermediate layer for performing the second inference task; and
    output the coherence score for the intermediate layer.

16. The system of claim 15, wherein the neural network analysis system is configured to:
  determine respective coherence scores for multiple ones of the plurality of layers; and
  select a particular intermediate layer from the multiple layers for building another machine learning model based at least in part on their respective coherence scores.

17. The system of claim 15, wherein to determine the coherence score, the neural network analysis system is configured to perform the clustering of the intermediate feature vectors using a k-means clustering technique, a mean shift clustering technique, or a density-based spatial clustering technique.

18. The system of claim 15, wherein to determine the coherence score, the neural network analysis system is configured to:
  determine an entropy of a first distribution of the class labels over the samples in the input dataset;
  determine a conditional entropy of a second distribution of the class labels over the individual samples in the input dataset given respective clusters assigned to the individual samples' intermediate feature vectors; and
  subtract the conditional entropy from the entropy to determine a mutual information metric for the first and second distributions.

19. The system of claim 18, wherein to determine the coherence score, the neural network analysis system is configured to normalize the mutual information metric for a number of intermediate feature vectors produced by the intermediate layer.

20. The system of claim 15, wherein:
  the neural network is trained to perform the first inference task is a first image classification task; and
  the second inference task is a different image classification task to classify images to a different set of classes.

* * * * *